United States Patent [19]

Thompson et al.

[11] Patent Number: 5,430,970
[45] Date of Patent: Jul. 11, 1995

[54] USE OF HOT WATER TO KILL VEGETATION

[76] Inventors: James E. Thompson, 1000-E Hoover Rd., Winter Haven, Fla. 33884; A. H. J. Rajamannan, 2120 Argonne Dr., Minneapolis, Minn. 55421

[21] Appl. No.: 233,776

[22] Filed: Apr. 26, 1994

Related U.S. Application Data

[63] Continuation-in-part of Ser. No. 126,262, Sep. 24, 1993, abandoned, which is a continuation-in-part of Ser. No. 935,865, Aug. 26, 1992, Pat. No. 5,297,730.

[51] Int. Cl.⁶ ............................................. A01C 1/00
[52] U.S. Cl. ............................ 47/1.5; 47/1.44; 43/138; 43/144
[58] Field of Search ............ 38/76, 77.1, 77.3, 9; 404/77, 79, 122, 128; 47/1.44, 1.43, 1.7, 1.5; 43/138, 144

[56] References Cited

U.S. PATENT DOCUMENTS

| | | | |
|---|---|---|---|
| 1,433,856 | 10/1922 | Smith | 47/1.44 |
| 1,509,340 | 9/1924 | Corson | 47/1.44 |
| 1,921,901 | 8/1933 | Anderson | 43/14.4 |
| 2,200,455 | 5/1940 | Ronning | 38/77.1 |
| 2,530,116 | 11/1950 | Dahl | 38/77.1 |
| 2,770,896 | 11/1956 | Holmberg | 38/77.1 |
| 4,961,283 | 10/1990 | Forbes | 43/124 |

FOREIGN PATENT DOCUMENTS

| | | | |
|---|---|---|---|
| 794812 | 2/1936 | France | 47/1.44 |
| 672675 | 5/1952 | United Kingdom | 404/103 |

Primary Examiner—Henry E. Raduazo
Attorney, Agent, or Firm—Pettis & McDonald

[57] ABSTRACT

An apparatus for controlling weeds and undergrowth by the application of hot water thereto. The apparatus is particularly characterized by its construction including an endless, ground-engaging belt, or apron, disposed immediately aft of the hot water spray. Thus, when hot water is sprayed on the weeds and undergrowth, the sprayed vegetation is not only compressed by the apron, but also heat from the water is retained therein, insulated from ambient conditions by the apron.

1 Claim, 2 Drawing Sheets

USE OF HOT WATER TO KILL VEGETATION

RELATED APPLICATION

This is a continuation-in-part application of application Ser. No. 08/126,262, filed Sep. 24, 1993, now abandoned, which was a continuation-in-part application of application Ser. No. 07/935,865, filed Aug. 26, 1992, now U.S. Pat. No. 5,297,730, issued Mar. 29, 1994.

BACKGROUND OF THE INVENTION

1. Field of the Invention

The present invention relates to an apparatus for controlling weeds and undergrowth in agricultural settings by the application of hot water thereto. According to a preferred embodiment, heated water is sprayed on the vegetation to be controlled, and followed immediately by an endless belt mounted on a pair of rollers just aft of the hot water spray, whereby the heated water is held in intimate contact with the vegetation by the belt or apron as the apparatus passes thereover.

2. Description of the Prior Art

Patents have been applied for and issued for killing weeds using hot water and/or a variety of heated spray materials. One such apparatus is disclosed in U.S. Pat. No. 5,297,730, issued Mar. 29, 1994. The apparatus of that invention is characterized by spraying a hot liquid onto the vegetation to be controlled, and then following the spray with a blanket or apron to serve as temporary insulation from ambient conditions including temperature and wind. A modified trailing apron was disclosed in our application Ser. No. 08/126,262, filed Sep. 24, 1993, now abandoned. Still another improvement, using heated water to kill vegetation, involves the use of a foaming blanket to insulate the vegetation after application of the hot liquid spray as disclosed in our co-pending application Ser. No. 08/126,261, filed Sep. 24, 1993.

However, as is apparent from even a brief consideration of this prior activity, such apparatus has involved the use of relatively large, expensive tractors, trailers and such implements. It is clear that there remains a need for an apparatus that will not only apply hot water to undesired vegetation for the purpose of killing it, but also include means for insulating the freshly-treated weeds and undergrowth from ambient conditions while providing an apparatus that can be utilized in small areas and operated and maneuvered by a single person.

SUMMARY OF THE INVENTION

The present invention comprises an apparatus for controlling weeds and undergrowth by the application of hot water. Most simply stated, the apparatus comprises a hood having a top plate and fore and aft flanges depending downwardly from the top plate, with a handle extending upwardly from the top plate. A pair of rollers are operatively disposed within the volume defined by the hood, and the rollers are dimensioned and configured to support the apparatus on a surface over which it is moved by pushing the handle. An endless belt, or apron, is mounted on the rollers for movement therewith as the apparatus is moved across the ground's surface, resulting in at least a segment of the apron contacting that surface. Finally, a supply of hot water is provided in fluid communicating relation to the apparatus and, more specifically, to at least one spray tip attached to the hood substantially adjacent the fore flange within the volume defined by the hood and between the fore flange and the roller closest thereto. The spray tip is in fluid communicating relation to the hot water supply so that hot water is sprayed onto the surface just forward of the apron and then held into intimate contact with the vegetation on which it is sprayed by the action of the apron as the apparatus is moved across the ground.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which.

Similar reference characters refer to similar parts throughout the several views of the drawings.

DETAILED DESCRIPTION

Figure 1:
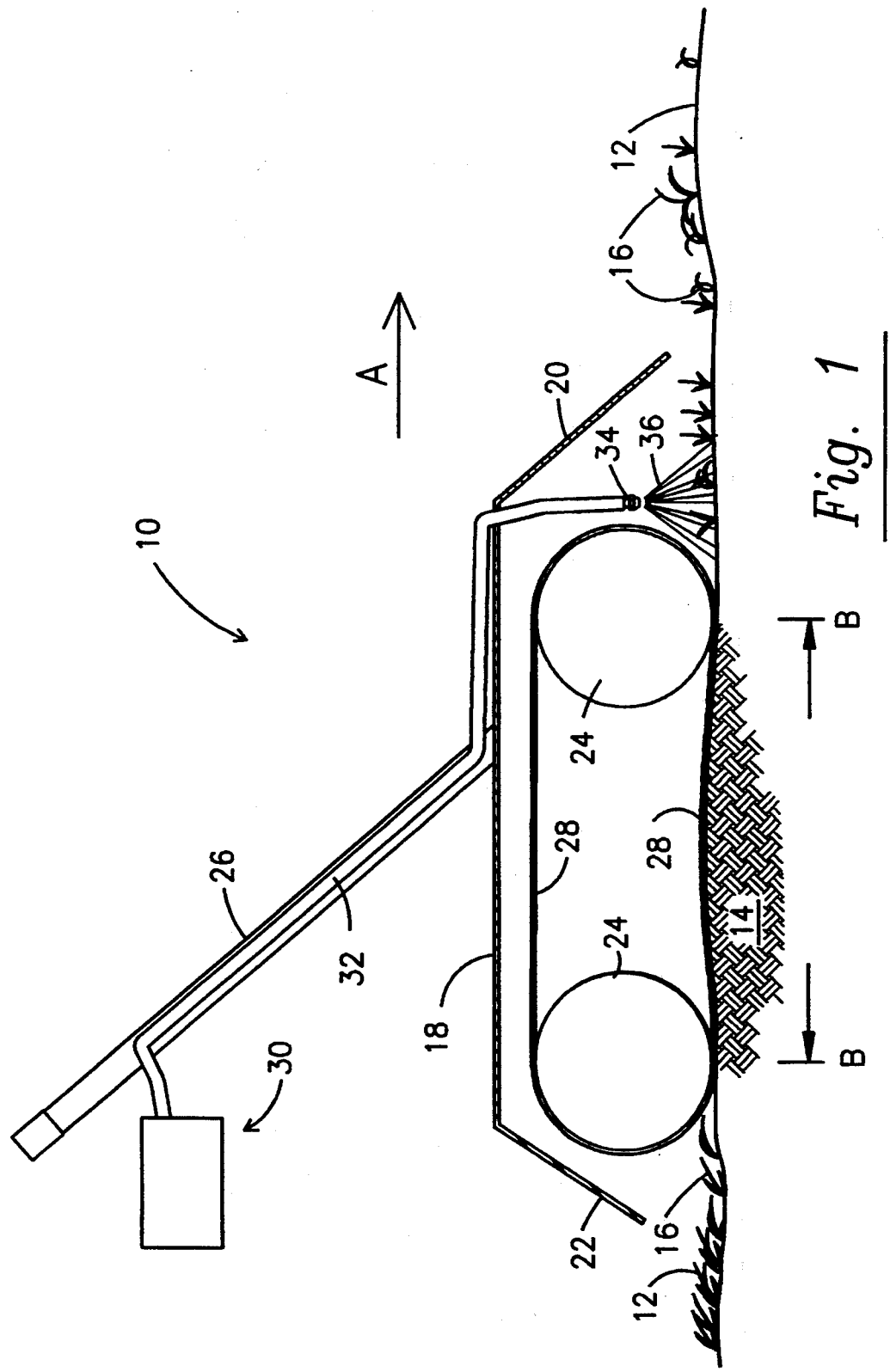
FIG. 1 is a side elevation of a preferred embodiment of the invention showing the hot water supply schematically.
Figure 2:
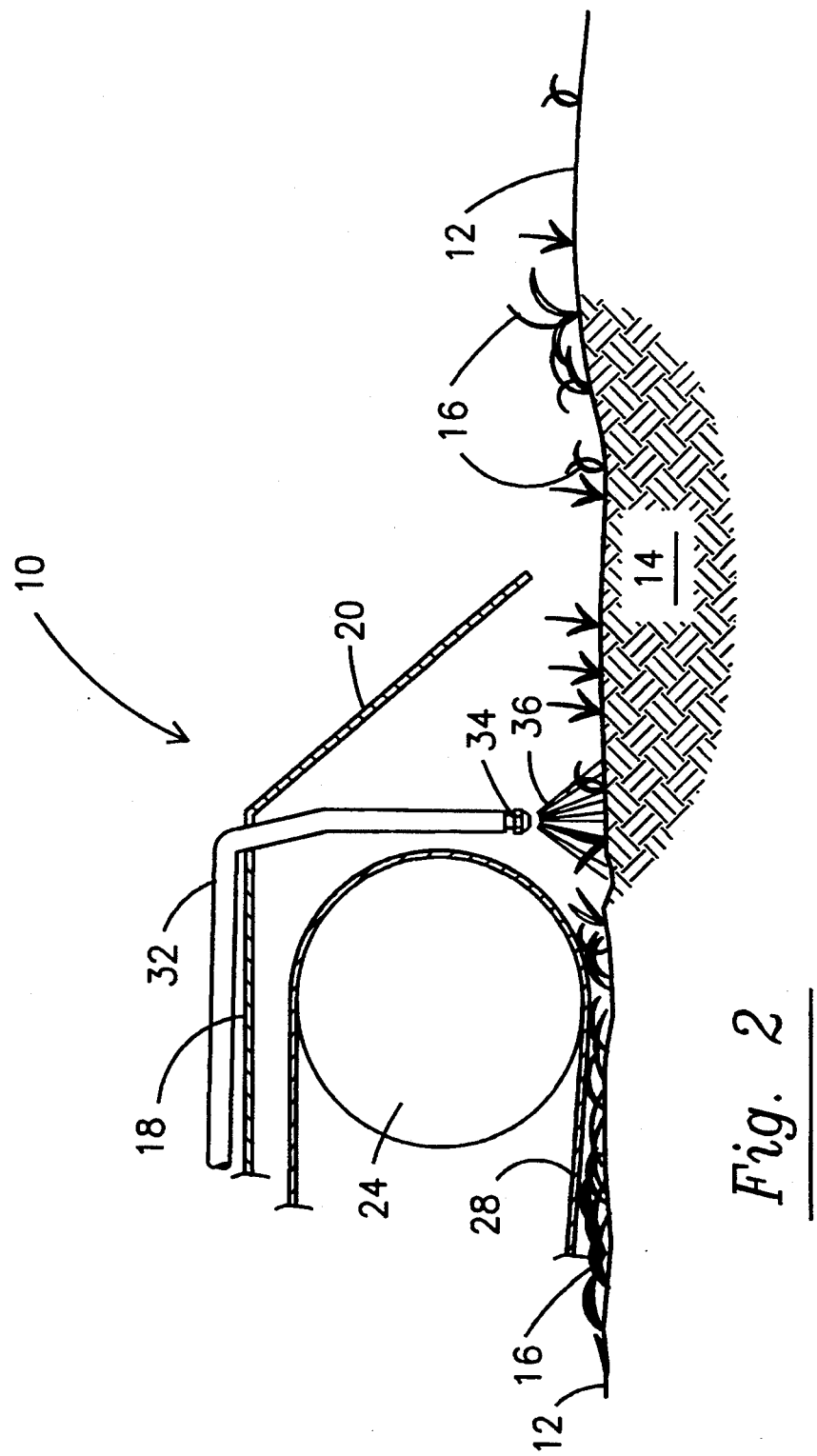
FIG. 2 is a detailed view of the forward portion of the apparatus shown in FIG. 1.

The apparatus of the present invention is generally indicated as 10 in the view of FIG. 1. As shown therein, apparatus 10 is positioned for movement across the surface 12 of ground 14, and a plurality of weeds 16 are shown growing upwardly from surface 12. The apparatus 10 comprises a hood having a top plate 18, a fore plate 20, and an aft plate 22. As clearly seen in the view of FIG. 1, both fore plate 20 and aft plate 22 depend downwardly from top plate 18.

A pair of rollers 24 are operatively disposed within the volume defined by top plate 18, fore plate 20, and aft plate 22. Rollers 24 are dimensioned and configured to support apparatus 10 on surface 12 as the apparatus 10 is moved thereacross in the direction of arrow A. Movement of apparatus 10 is easily accomplished by a user pushing on handle 26 which is attached to and extends upwardly from top plate 18.

An endless belt, or apron 28 is mounted around the rollers 24 for movement therewith as the apparatus 10 is pushed across surface 12. Accordingly, and as seen in the view of FIG. 1, a segment B—B of apron 28 is maintained in contact with surface 12 and any weeds 16 growing therefrom.

Shown schematically in the view of FIG. 1 is a source of supply for hot water, generally indicated as 30. A water conduit 32 is disposed in fluid communicating relation between source 30 and spray tip 34. Spray tip 34 is mounted within the volume defined by top plate 18, fore flange 20, and aft flange 22 substantially adjacent fore flange 20, and ahead of the roller 24 closer to that fore plate 20. By virtue of this construction, a spray 36 of heated water is applied to weeds 16, and then apron 28 will compress the weeds 16 to the surface 12 and perform as an insulation apron to hold the heat to the cuticular surface of the weeds for a period of time determined by the length of segment B—B and the speed with which the apparatus 10 is moved across surface 12.

It is to be understood that source 30 for hot water may comprise any one of a variety of physical embodiments. For example, source 30 may be as complex as the heated spray supply system disclosed in U.S. Pat. No. 5,297,730. In such a case, water conduit 32 of this invention would generally correspond to the conduits 28 of that patent. The specific structure of source 30 is neither critical to, nor limitative of, the scope of the present invention. All that is required is for source 30 to provide heated water at a temperature sufficient to dewax the cuticular layer of the leaves and stems of weeds 16.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. Apparatus for controlling weeds and undergrowth by the application of hot water, said apparatus comprising: a hood having a top plate and fore and aft flanges depending downwardly from said top plate; a handle extending upwardly from said top plate; a pair of rollers operatively disposed within the volume defined by said top plate and said fore and aft flanges, said rollers being dimensioned and configured to support said apparatus on a surface over which said apparatus is moved by pushing said handle; an endless apron mounted on said rollers for movement therewith as said apparatus is moved across the surface, at least a segment of said apron contacting said surface; a supply of hot water disposed in fluid communicating relation to said apparatus; and at least one spray tip attached to said hood substantially adjacent said fore flange within the volume defined by said top plate and said fore and aft flanges, said spray tip being in fluid communicating relation to said supply, whereby hot water is sprayed on the surface forward of said apron.

* * * * *